United States Patent [19]

Ryan

[11] Patent Number: 4,696,346

[45] Date of Patent: Sep. 29, 1987

[54] FARRIER'S TOOL

[76] Inventor: Michael K. Ryan, 111 W. 9th #143, Clovis, Calif. 93612

[21] Appl. No.: 902,496

[22] Filed: Sep. 2, 1986

[51] Int. Cl.⁴ .............................................. A01L 11/00
[52] U.S. Cl. ....................................... 168/45; 72/409; 81/391; 269/215
[58] Field of Search ............... 168/45, 47, 48; 128/321, 324, 346, 323; 72/409, 410; 269/212, 215, 257, 258; 81/386, 391, 392

[56] References Cited

U.S. PATENT DOCUMENTS

| 41,695 | 2/1864 | Giles | 168/45 |
|---|---|---|---|
| 42,918 | 5/1864 | Warren et al. | 168/48 |
| 260,837 | 7/1882 | Brüning | 72/409 |
| 881,619 | 3/1908 | Robidoux | 72/409 |
| 4,144,737 | 3/1979 | Izraeli | 81/393 X |

Primary Examiner—Robert P. Swiatek
Assistant Examiner—Richard T. Price
Attorney, Agent, or Firm—Norman B. Rainer

[57] ABSTRACT

A multi-functional adjustable hand tool useful in attaching shoes to the hooves of horses is comprised of two lever members pivotably interengaged in the general manner of pliers and having opposed fixed and adjustable jaws. The adjustable jaw is capable of being disposed in several positions relative to the fixed jaw to provide the various jaw separations of clinching tools used by farriers. A nail cutter associated with the jaws provides even further versatility of the tool, causing it to be a replacement for several standard farrier's tools.

4 Claims, 4 Drawing Figures

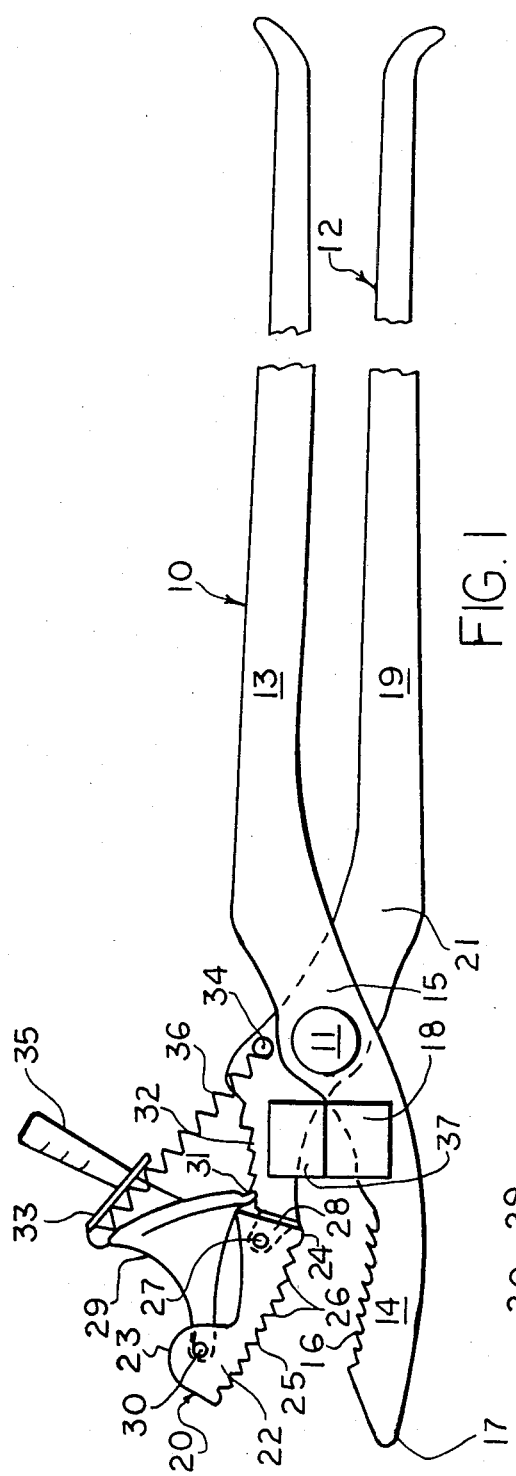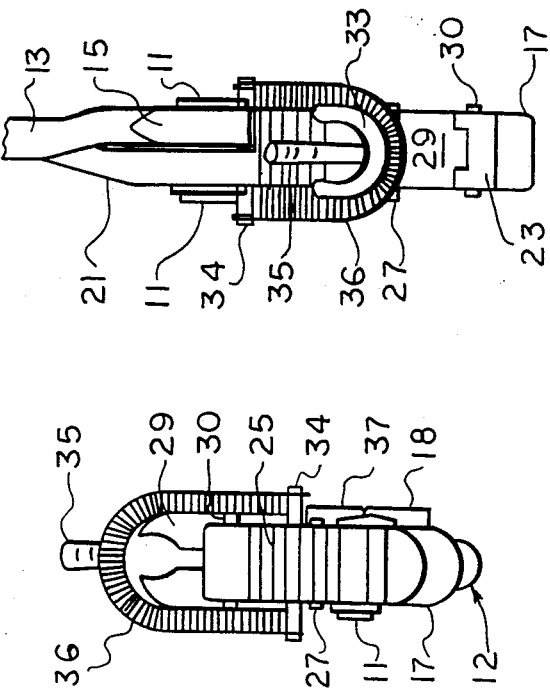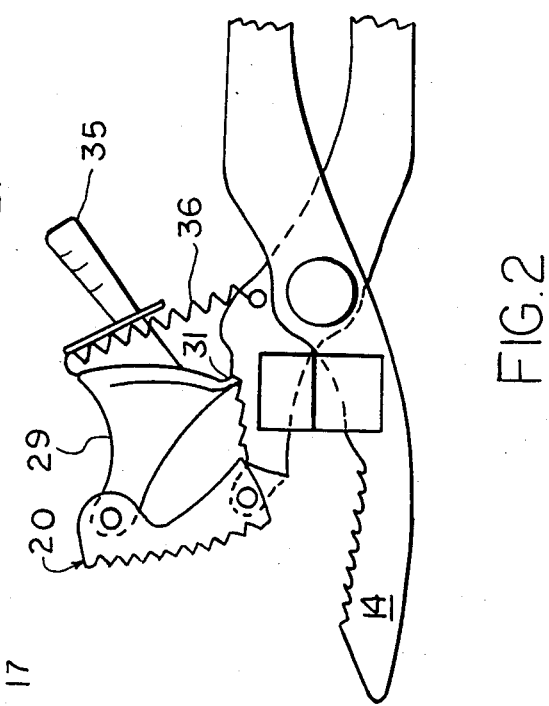

FARRIER'S TOOL

BACKGROUND OF THE INVENTION

This invention concerns a tool useful in horseshoeing, and more particularly relates to a multi-functional adjustable hand tool useful in attaching metal shoes to the hooves of horses.

In the shoeing of horses, a metal shoe is placed against the flat underside of the hoof, and specially designed nails are driven through apertures in the shoe and upwardly into the hoof. The pointed, upwardly directed extremity of the nail is caused to emerge from the sidewall of the hoof, said sidewall being tapered in an upwardly convergent manner. The extreme pointed extremity of the nail is then clipped off, and the remainder of the protruding nail is bent downwardly so as to form a hook which serves to retain the nail tightly within the hoof.

The act of downwardly bending the protruding portion of the nail is generally referred to as "clinching", and specialized tools have been designed for this manipulation. In particular, clinching tools are generally designed in the manner of pliers, having long handles and two pivotably interactive jaws, one of said jaws being adapted to press upward against the head of the nail below the horseshoe, and the other jaw being adapted to grip and bend downwardly the protruding upper extremity of the nail. Because of the variations in hoof shapes and sizes and variations in the site at which a nail may emerge from the sidewall of the hoof, clinching tools of different sizes and configurations have been necessary equipment for the farrier. The need for a number of separate tools is not only costly but can cause delays or require assistance in the course of horseshoeing activities.

It is accordingly an object of the present invention to provide a multi-purpose adjustable farrier's tool.

It is further object of this invention to provide a tool as in the foregoing object which serves the function of several clinching tools of conventional design.

It is another object of the present invention to provide a tool of the aforesaid nature additionally having nail-cutter capabilities.

It is a still further object of this invention to provide a tool of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a hand tool comprising:

(a) a first lever member of integral monolithic construction comprised of an elongated straight handle portion and a fixed jaw portion elongated in a direction substantially parallel to said handle portion, said jaw and handle portions being joined by a transition portion diagonally disposed to said fixed jaw and handle portion, (b) a second lever member comprised of an elongated straight handle portion and an adjustable jaw, said adjustable jaw and handle portions being joined by a transition portion diagonally disposed to said handle portion and adjustable jaw, (c) said first and second levers being interconnected by first pivot means in said transition portions, whereby the handles and jaws of both levers are in facing relationship, the jaws representing the forward extremity of the tool, (d) said adjustable jaw being comprised of: (1) a gripping arm having upper and lower extremities and a toothed forward surface, and second pivot means which join said lower extremity to said second lever member adjacent the transition portion thereof in a manner permitting movement of said gripping arm toward and away from said fixed jaw, (2) a positioning arm interengaged by third pivot means with the upper extremity of said gripping arm and rearwardly directed therefrom, and having a downwardly directed holding edge, (3) a series of holding grooves in said second lever member adapted to selectively engage said holding edge, thereby determining the spacing of the gripping arm with respect to the fixed jaw, (4) spring means adapted to urge said positioning arm downwardly to expedite secure engagement of said grooves by said holding edge, and (5) manipulating means attached to said positioning arm and extending upwardly and rearwardly therefrom, permitting manipulative movement of the positioning arm against the urging of said spring means, and (e) cutting means associated with said fixed and adjustable jaws.

In preferred embodiments of the invention, at least five holding grooves are utilized, thereby permitting five different juxtapositions of the fixed jaw and gripping arm. The forward extremity of the fixed jaw extends forwardly of the gripping arm regardless of the position of said gripping arm. The toothed forward surface of the gripping arm is preferably curved in a direction away from the fixed jaw. Stopping means may be provided to restrict the angular separation of the handle portions of the first and second lever members to about 45 degrees.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the tool of the present invention showing the jaws in their most closely spaced position.

FIG. 2 is a fragmentary side view of the tool of FIG. 1 showing the jaws in their most separated position.

FIG. 3 is a front view of the tool of FIG. 1.

FIG. 4 is a top view of the tool of FIG. 1.

For convenience in description, the expressions "front" and "rear" and terms of equivalent import will have reference to the left and right extremities, respectively of the tool as shown in FIG. 1. Similarly, the expressions "upper" and "lower" and words of equal meaning will have reference to the upper and lower extremities, respectively, of the tool as depicted in FIG. 1.

DESCRIPTION OF THE PREFERRED EMBODIMENT

Referring to the drawing, an embodiment of the tool of the present invention is shown comprised of first lever member 10 joined by first pivot means in the form of pivot pin 11 to second lever member 12. All parts of the tool are preferably of steel construction.

Said first lever member is of integral monolithic construction comprised of an elongated substantially straight handle portion 13 and a fixed jaw portion 14 elongated in a direction substantially parallel to said handle portion. The jaw and handle portions are joined by transition portion 15 diagonally disposed to said jaw and handle portions. The upwardly disposed surface of jaw portion 14 is provided with a series of V-shaped teeth 16. The forwardmost extremity 17 of said fixed jaw is tapered to a thinner cross-section than the remainder of said fixed jaw. Lower cutting blade 18 is affixed to one side of the fixed jaw and extends upwardly therefrom. The length and angular disposition of said transition portion is preferably such that, the long axis of the jaw and handle portions, although parallel, are spaced apart a distance between about $\frac{1}{2}$" and $1\frac{1}{2}$".

Second lever member 12 is comprised of elongated substantially straight handle portion 19 and adjustable jaw 20. Said handle portion 19 and jaw 20 are integrally joined to transition portion 21 diagonally disposed to said handle portion and jaw.

Said first and second levers are interconnected by pivot pin 11 which penetrates the transition portions of both lever members. As shown most clearly in FIG. 2, the handle portions are bent slightly toward each other just rearward of the transition portions, whereby both handle portions are centered one above the other in the same plane. By virtue of the aforesaid manner of interconnection of the first and second levers, the fixed and adjustable jaws are in facing juxtaposition.

Adjustable jaw 20 is comprised of gripping arm 22 having upper and lower extremities 23 and 24, respectively, forward surface 25 having V-shaped teeth 26, and second pivot pin 27 which joins said gripping arm to said second lever. Said pivotal joinder is foward of the transition portion of the second lever. To expedite said pivotal joinder, lower extremity 24 of the gripping arm is bifurcated, having opposed shoulders 28 which hold pivot pin 27. The aforesaid manner of pivotal joinder permits movement of the gripping arm toward and away from the fixed jaw. It is to be noted that the fixed jaw portion and gripping arm are thicker than the corresponding handle portions.

A positioning arm 29 is joined by third pivot pin 30 to upper extremity 23 of said gripping arm, and rearwardly directed therefrom. A holding edge 31 is downwardly directed from said positioning arm as a continuous integral extension thereof, and disposed perpendicularly to the axes of elongation of the handle portions.

A series of holding grooves, notches or teeth 32 is formed in the upper edge of said second lever forwardly of transition portion 21. The holding grooves are adapted to selectively engage holding edge 31, thereby determining the inclination of gripping arm 22 with respect to fixed jaw 14 at any given position of separation of said handle portions.

A coil spring 36 under tension straddles positioning arm 29, being held in place by arcuate retaining flange 33, both ends of said spring being anchored to opposite sides of holding pin 34 which penetrates transition portion 21 of said second lever member. The function of spring 36 is to urge the positioning arm downwardly to expedite secure engagement of grooves 32 by holding edge 31.

A manipulating lever 35 is attached to the rear extremity of said positioning arm, and extends upwardly therefrom. Said manipulating lever enables the positioning arm to be moved by thumb pressure against the urging of spring 36 so that holding edge 31 can be placed where desired within holding grooves 32. In some embodiments, manipulating lever 35 may be associated with a sliding cam housed within the rearward portion of positioning arm 29. In such embodiments, downward pressure on the lever causes rearward stepwise movement of holding edge 31 within holding grooves 32.

Upper cutting blade 37 is affixed to one side of the adjustable jaw and extends downwardly therefrom to mated engagement with lower cutting blade 18. In such manner of arrangement, the cutting blades serve to cut horseshoe nails when the handle portions are brought forcefully together.

By virtue of the design and interaction of the various component features of the tool of this invention, the fixed jaw and the gripping arm of the adjustable arm are capable of embracing the head and top extremities of an emplaced horseshoe nail despite variations in the height or angular disposition of the nail.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A multi-functional adjustable hand tool useful in attaching shoes to the hooves of horses, comprising:
    (a) a first lever member of integral monolithic construction comprised of an elongated straight first handle portion and a fixed jaw portion elongated in a direction substantially parallel to said first handle portion, said fixed jaw and handle portion being joined by a transition portion diagonally disposed to said fixed fixed jaw and handle portion,
    (b) a second lever member comprised of an elongated straight second handle portion and an adjustable jaw, said adjustable jaw and second handle portion being joined by a transition portion diagonally disposed to said second handle portion and adjustable jaw,
    (c) said first and second lever members being interconnected by first pivot means in said transition portions, whereby the handle portions and jaws of both lever members are in facing relationship, the jaws representing the forward extremity of the tool,
    (d) said adjustable jaw being comprised of: (1) a gripping arm having upper and lower extremities and a toothed forward surface, and second pivot means which join said lower extremity to said second lever member adjacent the transition portion thereof in a manner permitting movement of said gripping arm toward and away from said fixed jaw, (2) a positioning arm interengaged by third pivot means with the upper extremity of said gripping arm and rearwardly directed therefrom, and having a downwardly directed holding edge, (3) a series of holding grooves in said second lever member adapted to selectively engage said holding edge, thereby determining the spacing of the gripping arm with respect to the fixed jaw, (4) spring means adapted to urge said positioning arm downwardly to expedite secure engagement of said grooves by said holding edge, and (5) manipulating means attached to said positioning arm and extending upwardly and rearwardly therefrom, permitting manipulative movement of the position arm against the urging of said spring means, and (e) cutting means associated with said fixed and adjustable jaws.

2. The tool of claim 1 utilizing between four and six holding grooves.

3. The tool of claim 1 wherein the forward extremity of the fixed jaw extends forwardly of the gripping arm at all positions of said gripping arm.

4. The tool of claim 1 wherein the toothed forward surface of the gripping arm is curved in a direction convex with respect to the fixed jaw.

* * * * *